F. A. NOLAN.
WASHER.
APPLICATION FILED DEC. 3, 1917.

1,301,302.

Patented Apr. 22, 1919.

Old Form

INVENTOR:
FRANCIS A. NOLAN
BY:
ATTORNEY.

UNITED STATES PATENT OFFICE.

FRANCIS A. NOLAN, OF ST. PAUL, MINNESOTA.

WASHER.

1,301,302.

Specification of Letters Patent. Patented Apr. 22, 1919.

Application filed December 3, 1917. Serial No. 205,043.

*To all whom it may concern:*

Be it known that I, FRANCIS A. NOLAN, a citizen of the United States, residing at St. Paul, in the county of Ramsey and State of Minnesota, have invented a new and useful Improvement in Washers, of which the following is a specification.

This invention relates to improvements in washers for securing one object to another by the use of nails or other fasteners driven thereinto, the particular improvement being well adapted for securing resilient heels and soles on foot wear. When thus used the washers are embedded in the resilient material and the fasteners driven through said washers and material. This driving of the fasteners through the washers tends to loosen the washers from the resilient material and it is one of the objects of this invention to so engage the material laterally by each washer as to prevent the washer becoming separated, detached from and forced through the material.

Figure 3:
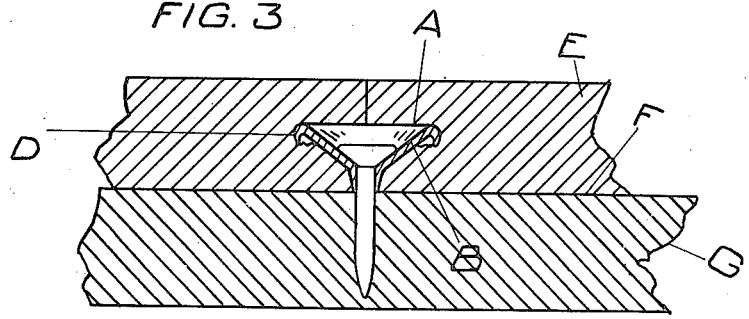
Figure 2:
Figure 1:
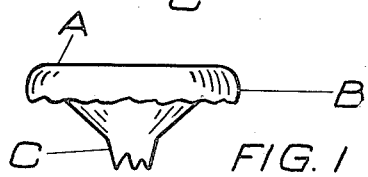
Figure 4:
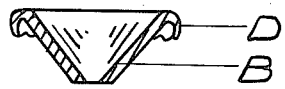
Figure 5:
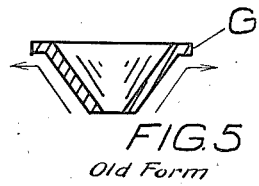

Further objects and features of improvement will be apparent from the following description:

In the accompanying drawing Figure 1 is a side elevation of my improved washer; Fig. 2 is a vertical section of my invention; Fig. 3 is another vertical section illustrating my improved washer in use for securing two objects together; Fig. 4 is a vertical section of an alternative construction of my invention, and Fig. 5 is a vertical section of an old style washer illustrated for the purpose of making a comparison between my improvement and the construction which has been formerly used.

In the drawing let A indicate my improved washer which is preferably although not necessarily stamped from thin metal or other suitable material. This washer is formed by the stamping operation with a counter sink B in its side extending completely from its rim to its perforated inner or lower end C and with a circumferential or downwardly tapering integral rim D. The material displaced in perforating the inner or lower end C is formed into a longitudinal shoulder of rather rough contour which forms a stop in a manner as will be hereinafter set forth.

In use the washer may be embedded during the molding of a rubber or other resilient heel or object indicated by E in Fig. 3 with its shoulder placed adjacent to the side F. A nail or other fastener is next driven through the resilient material and washer and into a support as illustrated in said Fig. 3. It will be observed that in this position the stop which presses against the surface of support G into which the fastener is driven prevents the head of the fastener from forcing the washers out of the resilient member E, and that the rim D most effectively engages and holds the resilient material constituting the body of member E and also prevents the material slipping and spreading laterally from under the washer as would happen were the washer formed with a shoulder such as G, (see Fig. 5) or without a shoulder. Thus the means provided by my invention for preventing lateral displacement of material in which the washer is embedded accomplishes a useful and important result not heretofore attained. The washer being formed with a circumferential rim and lower shoulder from a single piece of material economizes material for accomplishing most effective results. It is contemplated that the invention can be made without the shoulder at the inner or lower end of the counter sink when desired as in Fig. 4, the perforation being sharp cut.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention what I claim as new and desire to protect by letters patent is:

1. A washer having a conical countersink extending substantially from end to end of the washer and a continuous circumferential rim extending substantially parallel to the axis of the washer to completely embody a portion of the material, in which the washer may be embedded, said countersink extending to a greater depth than the height of said rim and said rim being adapted to prevent lateral spreading and displacement of material by said countersink.

2. A washer having a conical countersink extending substantially from end to end of the washer formed with a continuous circumferential rim at its upper end extending substantially parallel to the axis of the washer, said countersink extending to a greater depth than the height of said rim and said rim being adapted to prevent lateral displacement and spreading of a body of the material by said countersink and also formed with a circumferential stop extending substantially parallel to the axis of the washer and depending beyond the lower end of the countersink, adapted to hold the body of the washer at a distance removed from an object.

In testimony whereof, I have signed my name to this specification.

FRANCIS A. NOLAN.